United States Patent [19]

Vatter

[11] Patent Number: 4,665,702
[45] Date of Patent: May 19, 1987

[54] SUPPLY TANK

[75] Inventor: Waldemar Vatter, Laubach, Fed. Rep. of Germany

[73] Assignee: ITT Industries, Inc., New York, N.Y.

[21] Appl. No.: 637,407

[22] Filed: Aug. 3, 1984

[30] Foreign Application Priority Data

Aug. 6, 1983 [DE] Fed. Rep. of Germany ....... 3328533

[51] Int. Cl.[4] .............................................. F15B 7/10
[52] U.S. Cl. .................................................... 60/592
[58] Field of Search ................ 60/585, 592, 534, 535, 60/562; 220/20, 22

[56] References Cited

U.S. PATENT DOCUMENTS

| 3,989,056 | 11/1976 | Reinartz | 60/585 |
| 4,170,877 | 10/1979 | Pickering | 60/592 |
| 4,355,512 | 10/1982 | Kubota | 60/585 |
| 4,385,495 | 5/1983 | Kubota | 60/592 |
| 4,414,810 | 11/1983 | Reinartz et al. | 60/585 |
| 4,514,980 | 5/1985 | Ishiwata | 60/592 |

FOREIGN PATENT DOCUMENTS 3042693 6/1981 Fed. Rep. of Germany .

47118 4/1979 Japan ...................................... 60/592

Primary Examiner—Abraham Hershkovitz
Attorney, Agent, or Firm—James B. Raden; Donald J. Breh

[57] ABSTRACT

A supply tank for supplying fluid to a tandem master brake cylinder of a motor vehicle. The tank has a bottom section and a top section which is not shown. The bottom section comprises a partition wall which separates the two chambers from each other, the partition wall being formed with a passage which is arranged approximately in the center of the bottom section. In each chamber, an outlet is configured at each end of the bottom section. From each outlet and along the partition wall toward the middle of the bottom section, there extends one pipe which has an opening respective at its free end. The openings are positioned below the minimum admissible fluid level. The purpose achieved by the configuration of the pipes within the supply tank is that the effect of an inclination of the supply tank does not impair the efficiency of the hydraulic fluid and that, consequently, the outlets are supplied with hydraulic fluid at all times and in any condition.

5 Claims, 2 Drawing Figures

SUPPLY TANK

BACKGROUND OF THE INVENTION

The invention relates to a supply tank, in particular for a tandem master brake cylinder of an automotive vehicle serving to supply hydraulic fluid to the cylinder. The tank is furnished with a first chamber having an outlet connected to a first pressure chamber of the cylinder and is furnished with a second chamber having an outlet connected to a second pressure chamber of the cylinder, with both said tank chambers being separated from each other by a partition wall extending parallel to the driving direction of the vehicle and with the outlets being substantially arranged one behind the other in driving direction.

A supply tank of this kind is described in the German printed and published patent application No. 3042693. In the reference system, the outlets are located at the opposite ends of the supply tank in the driving direction and are separated by a partition wall. Due to the arrangement of each of the outlets at the respective outer ends of the relevant chambers, while driving up or down a steep slope and in the event of a strong acceleration, fluid will flow into that end of the relevant chamber which is opposite to the respective outlet. The upper outlet positioned in the plane of inclination is no longer covered with fluid, particularly if the filling level is not higher than the minimum level. The result is that although the filling level warning device located in the middle of the supply tank will yet trigger a warning contact in this condition, although an actual failure of a brake circuit may have occured.

SUMMARY OF THE INVENTION

Therefore, the present invention has as its object to create a supply tank which is reliable in operation in any condition and in which the efficiency of the hydraulic fluid is not impaired by the effect of inclination of the vehicle.

According to the present invention, this object is achieved in that an outlet pipe extends in each chamber from the outlet toward the center of that chamber, each pipe having an opening at its free end. Due to this arrangement, the open end of the pipe remains immersed in the fluid although the outlet has already come up out of the fluid, for example in the event of driving up or down a slope, or in the event of an acceleration, or of slowing down or driving through a curve. The use of especially long supply tanks with their outlets being positioned far apart is rendered possible by the present arrangement.

According to the invention, an especially simple and inexpensive manufacture of the supply tank is attained when the supply tank is divided into two parts and composed of a bottom section and a top section. The outlet pipes from the chambers are configured to form an integral part together with the bottom section and are oriented in such a manner that their cross-sectional areas projected in the longitudinal direction are positioned outside the rim of the bottom section. The configuration of the bottom section as a unitary structure facilitates the manufacture so that no additional costs will be incurred for the formation of the pipes. Due to the advantageous arrangement of the pipe within the bottom section, the mold slide required for the fabrication of the pipe can be easily removed from the pipe after the bottom section has been molded in an injection molding tool.

In a preferred version, it is also possible to provide a space in the longitudinal direction of the pipes, in the chambers from which the pipes extend, such space serving to allow removal of the cores used in molding the pipes in the shape of an integral part of the bottom section. By the use of this construction, the pipes may run at the bottom of the bottom section, with the projected cross-sectional areas of the pipes extending within the rim of the bottom section in the longitudinal direction of those pipes. Indeed, this advantageous configuration of the pipes allows the chamber spaces of the supply tank to be not much larger than the spaces which are required for the removal of the cores molding the pipes.

As an alternative, it is also possible that the pipes can be inserted in the bottom section if they cannot be injection-cast so as to form an integral part with the bottom section, that is in case of an unfavorable positioning or a difficult routing of said pipes.

In addition, safe operation of the supply tank is still safe-guarded by the provision of locating the highest point of the openings of the pipes slightly below the minimum admissible fluid level of the tank.

In accordance with the invention, it is advantageous when a passage is configured in the partition wall, to penetrate the partition wall in the vicinity of the center of gravity of the hydraulic fluid from the maximum admissible level down to the minimum admissible fluid level. This construction becomes important when one chamber of the brake circuit becomes defective. In such an arrangement, the sound chamber will bleed out through the passage toward the defective chamber in the event of a defective brake circuit, the filling level warning device will hereby be triggered anyway, no matter whether it is arranged in the defective or in the sound chamber. Even though, fluid will remain in the sound chamber up to the minimum admissible filling level, to provide a sufficient quantity of fluid to ensure a safe supply of the sound brake circuit. Thanks to this arrangement, a filling level warning device is required in one chamber only.

BRIEF DESCRIPTION OF THE DRAWINGS

One embodiment of the invention is described in more detail in the following description viewed, with reference to the drawing, in which.

DETAILED DESCRIPTION

Figure 1:
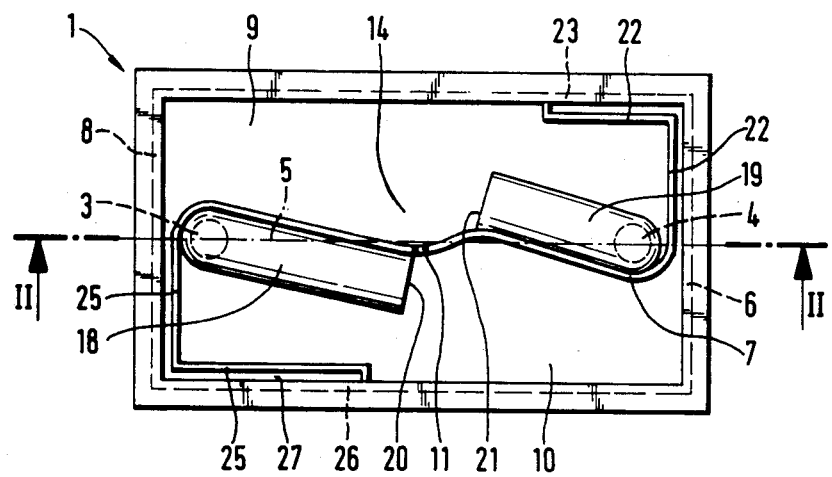
FIG. 1 is a plan view of the interior space of the bottom section of a supply tank employing the invention.
Figure 2:
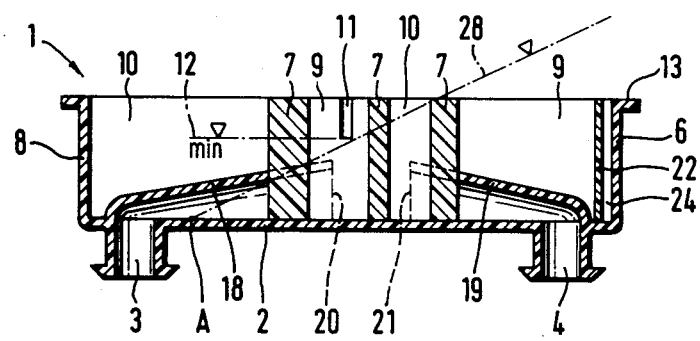
FIG. 2 is a vertical longitudinal cross-section through the bottom section of a supply tank along the sectional axis II—II indicated in FIG. 1.

In FIGS. 1 and 2, the bottom section 1 is formed by a box-type tank which is open on top and has a bottom wall 2 at its lower end with two vertically downwardly directed outlets 3 and 4 which serve to connect the tank to a first and a second pressure chamber of a tandem master cylinder (not shown in the drawing).

The longitudinal direction (or driving direction of the vehicle in which the tank is used) of the bottom section 1 is indicated by the dashed line 5 which connects the two outlets 3 and 4.

In the longitudinal direction of the bottom section 1, there extends a partition wall 7 from the wall 6 shown on the righthand side in the drawing, which partition wall 7 separates the space of the bottom section 1 into an upper first chamber 9 and a lower second chamber 10 (as viewed in FIG. 1). Approximately in the center of the bottom section 1, the partition wall 7 is provided with a passage 11 which extends from the minimum admissible fluid level 12 up to the plane of division 13 of the bottom section 1. The plane of division 13 runs horizontally in the drawing as seen in FIG. 2. A top section not shown in the drawing is fastened on the rim located in the plane of division 13 so that the cross-section of the bottom section 1 existing in the plane of division 13 continues identically in the top section. Therewith, also the passage 11 continues smoothly into the top section and extends at least up to the maximum fluid level. The partition wall 7 extends up to the cover of the top section. At the top section, there is fastened at least one filler neck with a screw cap and a fluid level warning device so that a float of the warning device projects into the space 14 formed in the bottom section 1. Since the float is always arranged roughly in the center of the supply tank, the float is virtually prevented from dancing up and down under the effect of shocks acting on the supply tank. In this way, false warnings are avoided.

From each of the outlets 3 and 4 in either chamber 9 and 10, a respective pipe 18 and 19 extends in juxtaposition to and along the partition wall 7 toward the middle of the bottom section 1 where each pipe ends with an opening 20 or 21 at its free end. The pipes 18 and 19 are flared out conically toward the center of the bottom section 1 in order to allow the mold slides not shown in the drawing and used for the manufacture of the pipes to be removed easily out of the bottom section 1.

Starting from the righthand end of the partition wall 7, there runs a shuttering wall 22 in upward direction at a slight distance from and parallel to the righthand wall 6 as viewed in the drawing. The shuttering wall 22 then continues along the upper wall 23 at a slight distance from it up to the middle of the bottom section 1 and finally ending up in the side wall 23. The chamber 24 which is formed between the righthand wall 6, the upper side wall 23 and the shuttering wall 22 communicates with the second chamber 10 and serves the purpose of allowing a check of the filling level from all sides of the supply tank. Analogously, starting from the lefthand end of the partition wall 7, a further shuttering wall 25 extends in downward direction and subsequently to the right (as viewed in FIG. 1), the shuttering wall 25 in conjuction with the lefthand wall 8 and with the lower side wall 26 forms the chamber 27 which communicates with the first chamber 9. In FIG. 2, there is illustrated a fluid level 28 which may occur for example during an acceleration of a vehicle. This drawing reveals that the opening 20 of the pipe 18 is still covered by the fluid so that the outlet 3, in its turn, is still supplied with fluid through the pipe 18. If the pipe 18 did not exist, then the fluid level 28 would end at the bottom 2 of the bottom section 1 before reaching the mouth of the outlet 3 and the outlet 3 would no longer be supplied with fluid.

Although it is true that in the event of an inclined position about the longitudinal axis 5, part of the fluid will flow through the passage 11 into the chamber 9 or 10, i.e. the one which happens to be positioned lower. No failure of the braking system will occur thanks to the fact that the outlets 3 and 4 are arranged on the longitudinal axis 5. A false signalling of the filling level warning device is averted since the float cannot sink down further even on reaching the minimum filling level, that is to say, irrespective of the inclined position the supply tank may have assumed.

What is claimed is:

1. A hydraulic fluid supply tank for vehicular brake system, said tank comprising:
    a first compartment including an outlet port adapted to connect to a first one of a pair of pressure cylinders:
    a second compartment including an outlet port adapted to connect to a second one of said pair of pressure cylinders:
    a partition wall extending longitudinally to a driving direction of a vehicle having said brake system separating said tank into said first and second compartments;
    said outlet ports being disposed in spaced-apart relationship longitudinally to said driving direction:
    a pair of inlet pipes, one each extending from a respective one of said outlet ports on opposite sides of said partition wall into said first and second compartment respectively, each of said inlet pipes having an open free end positioned in close proximity to the center of the respective first and second compartment.

2. A supply tank as claimed in claim 1, in which said partition wall includes a passage therethrough proximate the center of gravity of the hydraulic fluid from a predetermined maximum admissible level to a predetermined admissable fluid level.

3. A supply tank as claimed in claim 1, wherein said partition wall is curvilinear shaped about the principle longitudinal axis of said tank and each of said outlet ports is disposed on said longitudinal axis of said tank.

4. A supply tank as claimed in claim 1, wherein said tank includes a top section and a bottom section, said partition wall and each said inlet port disposed in a bottom wall of said bottom section, said partition wall and each of said pair of pipes being an integral part of said bottom section, each of said pair of pipes defining a generally conical longitudinal cross-sectional shape expanding from said respective inlet port to said free open end thereof.

5. A supply tank as claimed in claim 4, in which a highest point of the openings of each of said pipes about the bottom wall is located at a position at least below a predetermined minimum admissible fluid level of the tank.

* * * * *